US012746524B2

(12) United States Patent
Demesy

(10) Patent No.: US 12,746,524 B2
(45) Date of Patent: Sep. 29, 2026

(54) MIXING PLANT WITH INTERMEDIATE PURGE AND ASSOCIATED CONTROL METHOD

(71) Applicant: EXEL INDUSTRIES, Epernay (FR)

(72) Inventor: Ludovic Demesy, Vaulnaveys-le-Haut (FR)

(73) Assignee: EXEL INDUSTRIES, Epernay (FR)

( * ) Notice: Subject to any disclaimer, the term of this patent is extended or adjusted under 35 U.S.C. 154(b) by 645 days.

(21) Appl. No.: 18/322,812

(22) Filed: May 24, 2023

(65) Prior Publication Data

US 2023/0381725 A1 Nov. 30, 2023

(30) Foreign Application Priority Data

May 31, 2022 (FR) ....................................... 2205217
Aug. 1, 2022 (FR) ....................................... 2207978

(51) Int. Cl.

*B01F 35/00* (2022.01)
*B01F 25/31* (2022.01)
*B01F 35/22* (2022.01)
*B01F 35/75* (2022.01)
*B01F 25/00* (2022.01)

(52) U.S. Cl.

CPC ........ *B01F 35/7547* (2022.01); *B01F 25/311* (2022.01); *B01F 35/2202* (2022.01); *B01F 2025/9191* (2022.01)

(58) Field of Classification Search

CPC .............. B01F 35/7547; B01F 35/2202; B01F 25/311; B01F 2025/9191
See application file for complete search history.

(56) References Cited

U.S. PATENT DOCUMENTS 6,056,822 A 5/2000 Jefferson et al.
11,266,059 B2 3/2022 David et al.
11,266,959 B2 3/2022 Bayer et al.
2018/0133665 A1* 5/2018 Brammer ................ B01F 23/19

FOREIGN PATENT DOCUMENTS

EP 1743913 A1 1/2007
GB 2348709 A 10/2000

OTHER PUBLICATIONS

FR 2207978, INPI Rapport de Recherche Preliminaire, Mar. 17, 2023, 2 pages.
FR 2205217, INPI Rapport de Recherche Preliminaire, Jan. 18, 2023, 2 pages.

* cited by examiner

*Primary Examiner* — Anshu Bhatia
(74) *Attorney, Agent, or Firm* — Soquel Group LLC

(57) ABSTRACT

The invention relates to a mixing installation for forming a multi-component product. The mixing installation comprises a material flow line having a first injection inlet, a second injection inlet and a third injection inlet. The third injection inlet is arranged downstream of the first injection inlet and the second injection inlet. The flow line (is provided with a purge downstream of the third injection inlet and arranged directly at the outlet of the third injection inlet, the purge being movable between an active state of purging an upstream part of the flow line and a passive state in which the purge allows the material to flow in the flow line. The invention further relates to an associated control method.

14 Claims, 4 Drawing Sheets

MIXING PLANT WITH INTERMEDIATE PURGE AND ASSOCIATED CONTROL METHOD

REFERENCE TO RELATED APPLICATIONS

This application is a U.S. non-provisional application claiming the benefit of French Application No. 22 07978, filed on Aug. 1, 2022, and French Application No. 22 05217 filed on May 31, 2002, the contents of which are incorporated herein by reference in their entirety.

TECHNICAL FIELD OF THE INVENTION

The present invention relates to a mixing installation for forming a multi-component product, the mixing installation comprising a material flow line, the flow line being provided with a first injection inlet of a first material component, a second injection inlet of a second material component and a third injection inlet of a third material component, the second injection inlet being arranged downstream of or parallel to the first injection inlet, the third injection inlet being arranged downstream of the first injection inlet and the second injection inlet.

The invention further relates to an associated control method.

BACKGROUND OF THE INVENTION

Such a mixing installation is known for making a multi-component product.

EP 3 460 242 B1 describes, for example, a pump system for discharging multi-material component under pressure using a spray gun. The system comprises three pumps for pumping one material component each and a control device comprising a control device for regulating a mixing ratio of the material components.

However, it may be observed at the output of the system that the multi-material component does not meet the desired criteria.

It is then necessary to undertake a purge of the system, which results in a significant amount of waste material that must then be processed. This represents both an economic loss due to the loss of material and the processing of the waste.

In addition, the loss of material and the processing of waste are environmental issues.

SUMMARY OF THE INVENTION

One aim of the invention is therefore to reduce the ecological and financial impact of such a mixing installation.

To this end, the invention has as its object a mixing installation of the aforementioned type, in which the flow line is provided with a purge downstream of the third injection inlet and arranged directly at the outlet of the third injection inlet or arranged upstream of the third injection inlet and downstream of the first injection inlet and the second injection inlet, the purge being movable between an active state of purging an upstream part of the flow line and a passive state in which the purge allows the material to flow in the flow line.

The purge thus offers the possibility of purging only a part of the system, especially upstream of the purge. This is advantageous when material upstream of the purge presents a defect, and not the material downstream.

According to particular embodiments, the installation comprises one or more of the following features, taken individually or in any technically possible combination:

- the third injection inlet is arranged in an injection block; the purge being arranged downstream of the injection block and adjacent to said injection block or in the injection block downstream of the third injection inlet or upstream of the injection block and adjacent to said injection block;
- the purge comprises at least one purge valve;
- the purge comprises a plurality of purge valves, each purge valve being movable between a purge state, in which said purge valve purges material passing through said purge valve, and an open state, in which said purge valve allows material to flow in the flow line opposite said purge valve;
- the installation comprises at least one waste container, the purge valve directly discharging the material upstream in the flow line into the at least one waste container;
- the installation comprises at least one purge pipe, the purge pipe being connected to the purge, the purge discharging material upstream in the flow line into the at least one purge pipe; and/or
- the installation comprises a flush valve arranged and adapted to inject flush liquid between the purge and the purge pipe.

The invention further relates to a method for controlling a mixing installation, comprising the following steps:

- providing a mixing installation such as described above, with the purge in a passive state,
- injecting a first material component at the first injection inlet,
- injecting a second material component at the second injection inlet
- injection of a third material component at the third injection inlet,
- monitoring the material in the flow line opposite the purge, and
- moving the purge into the active state as a function of the monitoring.

According to a particular embodiment, the method comprises the following features:

- the monitoring step comprises a step of analyzing the product in the flow line facing the purge and/or a step of monitoring the length of time between the injection of the second component material and its flow facing the at least one purge; and/or
- the first material component is continuously injected into the flow line, the second material component and the third material component each being selectively injected.

The invention further relates to a processing installation for realizing a deposition of a coating material on workpiece, comprising a mixing installation according to the invention and an application device, or a sprayer.

BRIEF DESCRIPTION OF THE DRAWINGS

The invention will be better understood from the following description, given only by way of example and made with reference to the attached drawing, in which.

DETAILED DESCRIPTION

The terms "upstream" and "downstream" are hereinafter understood in the usual sense for fluid flow.

Figure 1:
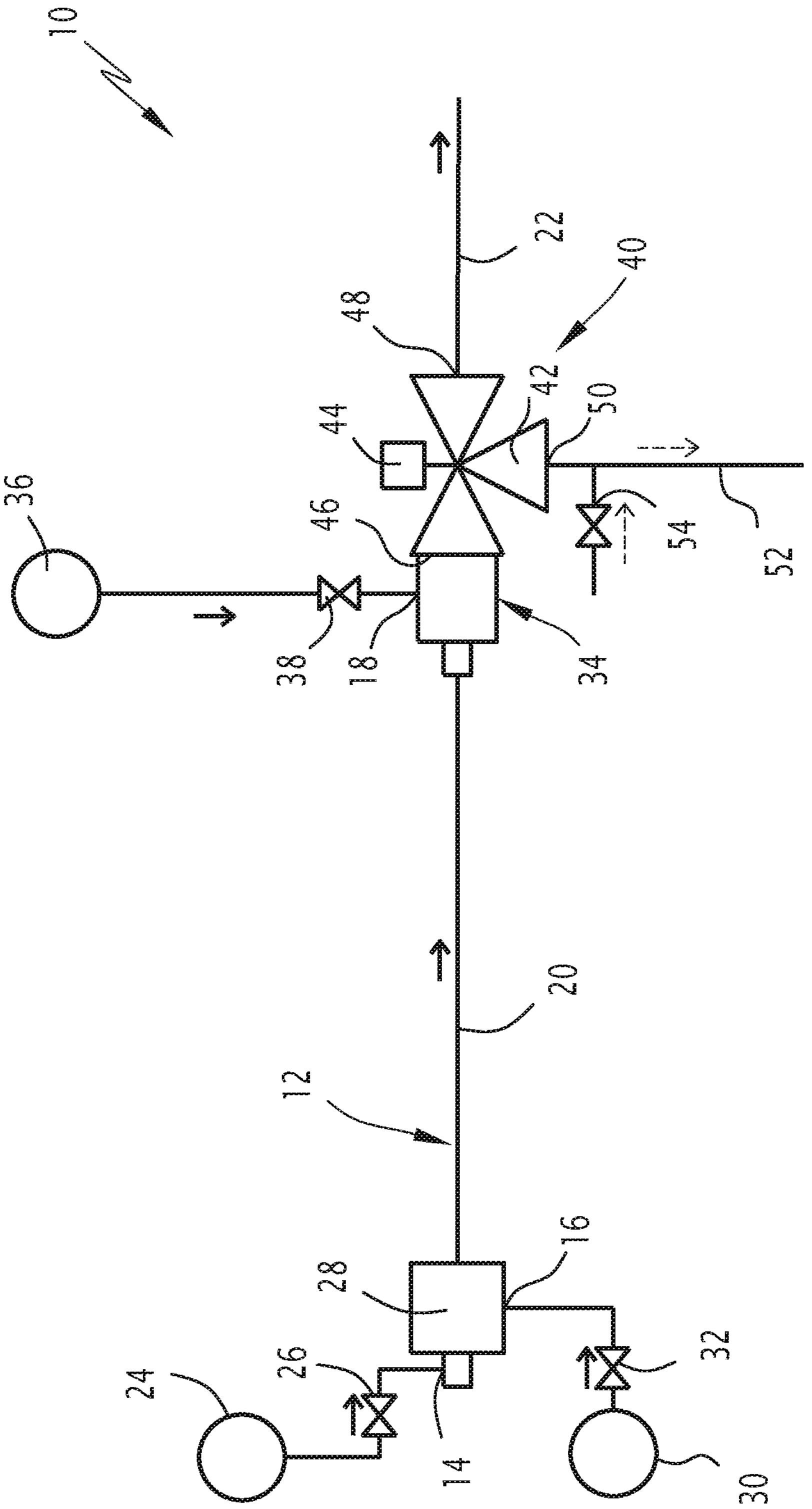
FIG. 1 is a schematic view of a first example of a mixing installation according to one embodiment of the invention.

An example of a mixing installation 10 for forming a multi-component product according to the invention is shown in FIG. 1.

Such an installation is used to produce a mixture of products intended to be sprayed or extruded, for example a paint or paint base, sealants, lacquers, adhesives.

The installation comprises a material flow line 12, feeding in practice an applicator or a spraying device (not shown).

The flow line 12 is provided with a first injection inlet 14 of a first material component, a second injection inlet 16 of a second material component and a third injection inlet 18 of a third material component.

The second injection inlet 16 is arranged downstream of or parallel to the first injection inlet 14, here in the example shown downstream of the first injection inlet 14.

The third injection inlet 18 is arranged downstream of the first injection inlet 14 and the second injection inlet 16.

Thus, the flow line includes a first part 20, between the second injection inlet 16 and the third injection inlet 18, and a second part 22, downstream of the third injection inlet 18.

The first part 20 of the flow line 12 is provided for the flow of a material comprising the first material component and the second material component, without the third material component.

The second part 22 of the flow line 12 is provided for the flow of a material comprising the first material component, the second material component, and the third material component.

Each material component is a fluid material.

The first injection inlet 14 is fed by a supply 24 of the first material component.

The first material component is, for example, a base product, in this case a paint base.

The supply of the first material component to the first injection inlet 14 is, for example, controlled by a first injection valve 26.

Alternatively, the first injection inlet 14 is fed continuously without possible interruption by a valve.

The second injection inlet 16 is adapted to inject the second material component into the first material component flowing in the flow line 12 at the second injection inlet 16, for example at an injection block 28.

The second injection inlet 16 is fed by a supply 30 of the second material component.

The second material component is, for example, a catalyst or a hardener.

The supply of the second material component to the second injection inlet 16 is, for example, controlled by a second injection valve 32.

Alternatively, the second injection inlet 16 is fed continuously, without interruption by a valve.

The installation is adapted to dose the injected first material component and the injected second material component as a function of a desired first ratio of first material component to second material component.

The first material component and the second material component are then in contact in the first part 20 of the flow line.

In one embodiment, the flow line 12 presents a mixer, which may comprise a static mixer and/or a dynamic mixer, arranged in the first part 20 of the flow line 12.

The mixer is adapted to improve the mixing of the first material component and the second material component.

The mixing of the first material component and the second material, referred to as first mixing, causes a reaction to start between the first material component and the second material component, in the first part 20 of the flow line 12.

The reaction comprises, for example, curing and/or drying the first mixture.

This first mixture has a first service life.

By service life is meant the length of time during which this first mixture is considered usable.

The first service life depends, in particular, on the nature of the first material component and the second material component, and also, for example, on the ratio of the amount of the first material component to that of the second material component.

The first service life is, for example, less than one hour.

The third injection inlet 18 is adapted to inject the third material component into the flowline 12 at the third injection inlet 18, specifically into the first mixture.

The third injection inlet 18 is arranged in an injection block 34.

The third injection inlet 18 is fed by a supply 36 of a third material component.

The third material component is, for example, a diluent, which may comprise water or a solvent.

The supply of the third material component to the third injection inlet 18 is, for example, controlled by a third injection valve 38.

Alternatively, the third injection inlet 18 is supplied continuously, without interruption by a valve.

In the present embodiment, the installation is adapted to dose the injected third material component as a function of a desired second ratio of the amount of third material component to the amount of first and/or second material component.

Here, the third material component dilutes the first mixture in the second part 22 of the flow line 12.

In one embodiment, the flow line 12 presents a mixer, which may comprise a static and/or dynamic mixer, arranged in the second part 22 of the flow line 12.

The mixer is adapted to improve the mixing of the first mixture and the third material component.

The mixing of the first mixture and the third material component is herein referred to as the second mixture.

The addition of the third material here results in the dilution of the first mixture.

In particular, this allows to obtain a mixture with the desired viscosity, especially for optimal subsequent application of the multi-component product.

The reaction of the first mixture is then, for example, slowed down or stopped, at the time of dilution.

For example, diluting the first mixture with the third material component allows the curing of the multi-component product to be delayed, before it is considered unusable.

This second mixture has a second service life.

The second service life is strictly greater than the first service life.

The second service life is, for example, greater than two hours.

The flow line 12 is provided with a purge 40.

The purge 40 is arranged downstream of the third injection inlet 18 and directly at the outlet of the third injection inlet (18).

Here, the purge 40 is placed as close as possible to the third injection inlet 18.

In the example shown, the purge 40 is arranged downstream of the injection block 34 comprising the third injection inlet 18 and adjacent to said injection block 34.

In particular, this allows an existing device to be easily adapted by adding the purge to achieve the benefits of the invention.

Alternatively, the purge 40 is arranged in the injection block 34 downstream of the third injection 18.

This allows for a gain in compactness.

The distance between the purge 40 and the third injection inlet 18 is less than or equal to 5 centimeters.

The purge 40 is movable between an active purge state and a passive state.

In the active state, the purge 40 is adapted to purge the part of the flow line 12 upstream of said purge 40, in other words, here substantially the first part 20 of the flow line 12 and the third injection inlet 18.

In the passive state, the purge 40 allows the material to flow through the flow line 12, that is, from the first part 20 to the second part 22 of the flow line 12.

In the example shown, the purge 40 comprises a purge valve 42.

The purge 40 is controllable by a controller 44.

The purge valve 42 is here a three-way valve comprising an inlet 46 and two outlets 48, 50.

The inlet 46 is connected to the outlet of the third inlet 18.

A first outlet 48 is connected to the flow line 12 downstream of the purge 40.

The input is selectively connected to one of the two outputs.

More specifically, in the active state of the purge, the inlet is connected to the second outlet 50, and in the passive state, the inlet is connected to the first outlet 48.

The purge 40, more particularly the second outlet 50 of the purge valve 42, is, for example, connected to a purge pipe 52. Thus, the purge 40, in an active purge state, discharges the material upstream in the flow line, into the purge pipe 52.

There are several alternatives in which this function can be achieved. In one embodiment, the sprayer or applicator at the end of the second part 22 of the flow line 12 is closed, which blocks the flow of the material into the second part 22 of the flow line 12, and then, during injection of the material into the first part 20 of the flow line 12, causes the material in the first part 20 to flow into the purge pipe 52. In one alternative, the purge valve 42 is able to open the second outlet 50 and close the first outlet 48 when it passes to the active purge state, thereby directing the flow of material injected into the first part 20 to the purge pipe 52

The purge pipe 52 is, for example, connected to a waste container, whereby material discharged into the purge pipe 52 being discharged into the waste container.

Advantageously, the installation comprises, for example, a flush valve 54 arranged and adapted to inject flush liquid between the purge 40 and the purge pipe 52, more particularly between the second outlet 50 and the purge pipe 52.

The flush valve 54 allows flushing of the flush pipe 52.

Alternatively, the system does not comprise a purge pipe, but comprises a waste container, with the purge 40 directly discharging the material upstream in the flow line 12 into the waste container. By "directly" is meant that there is no pipe between the purge 40, more specifically, the second outlet 50 of the purge valve 42, and the waste container.

The controller 44 is able to move the purge 40 between the active and passive states.

The controller 44 is, for example, a valve provided to be moved manually by a user.

Alternatively, the controller 44 is an automatic control module.

The control module is, for example, realized as software, or a software brick, executable by a processor.

Alternatively, the control module is realized in the form of a programmable logic component, such as an FPGA (Field Programmable Gate Array), or in the form of a dedicated integrated circuit, such as an ASIC (Application Specific Integrated Circuit).

When the control module is realized in the form of one or more software programs, that is, as a computer program, it is in addition able to be recorded on a computer-readable medium, not shown. The computer-readable medium is, for example, a medium capable of storing electronic instructions and of being coupled to a bus of a computer system. For example, the readable medium is an optical disk, a magneto-optical disk, a ROM memory, a RAM memory, any type of non-volatile memory (for example, EPROM, EEPROM, FLASH, NVRAM), a magnetic card or an optical card. A computer program with software instructions is then stored on the readable medium.

The purge 40 is able to selectively purge the flow line 12 upstream of the purge 40.

In particular, this allows only a part of the flow line to be purged, rather than having to purge the entire flow line, even when the reason for the purge is located in the first part of the flow line.

The location of the purge allows all of the first mixture to be removed from the entire flow line 12, including the entire first part 20.

In the example mentioned, it is, for example, particularly advantageous to be able to purge the flow line at the purge when at least part of the first mixture in the first part has been realized, by mixing the first material component and the second material component, for a period of time longer than the first service life, while the second mixture in the second part has been made for a period of time shorter than the second service life.

In a first embodiment, the first part 20 of the flow line 12 is purged by means of the purge 40 when it is necessary to purge the product present in the first part 20.

For example, if a wrong ratio of dosing between the first product and the second product has been made and injected into the flow line 12, it is possible to purge the first part 20 while retaining the mixture present in the second part 22.

In another example, during an interruption in the use of the system, it may be necessary to purge the first mixture before it begins to react in the line, while retaining the second mixture with the longer service life in the second part 22.

Thus, it is possible to purge only the first mixture in the part of the flow line upstream of the purge, which comprises the first part.

All of the second mixture in the second part can therefore be retained in the second part 22 if there is no need to purge this mixture.

It is then possible to form a new first mix, then second mix, and restart the application or spraying, without having any trace of the old first mix.

This results in a large reduction in purged material, which is wasted, and in waste to be processed. In practice, this allows to economize the material contained in the line between the purge 40 and the material spray or application device. The amount of material thus economized represents a ratio of the volume of product contained in the second part 22 to the volume contained in the flow line 12. In practice, the volume contained in the second part 22 may represent ten to twenty times the volume contained in the first part 20. In this hypothesis, it is possible to achieve on purging an economy of product of the order of 90% relative to a structure in which the product present in the second part 22 would necessarily be purged at each purging of the first portion 20. In other words, such a structure would allow to achieve a reduction of the order of 90% of the waste produced at the time of purging the flow line 12.

In one alternative, the purge includes a plurality of valves, each of which being, for example, intended to discharge the mixture toward different waste tanks.

More particularly, the plurality of valves are similar to that described above and arranged in series and in succession along the flow line, after the third injection inlet.

Thus, the first outlet of each valve other than the last is connected to the inlet of the next valve.

The valves here are adjacent to each other.

Each valve is, for example, connected at its respective second outlet to a purge pipe or directly to a respective waste container.

Each purge pipe is, for example, arranged with a waste container and/or a flushing system as described above with respect to the case where the purge comprises a valve.

Each valve is able to be moved between a purge state and an open state. In the purge state, the inlet of the corresponding valve is connected to its second outlet, while in the open state, the inlet of the corresponding valve is connected to its first outlet.

When at least one of the valves is in its respective purge state, the purge is in the active state.

When all the valves are in their respective open state, the purge is in a passive state, meaning that the material entering the purge at the inlet of the first of the valves flows from valve to valve to the outlet 168 of the last of the valves.

This allows for sorting of the purged products for better product recycling.

Figure 2:
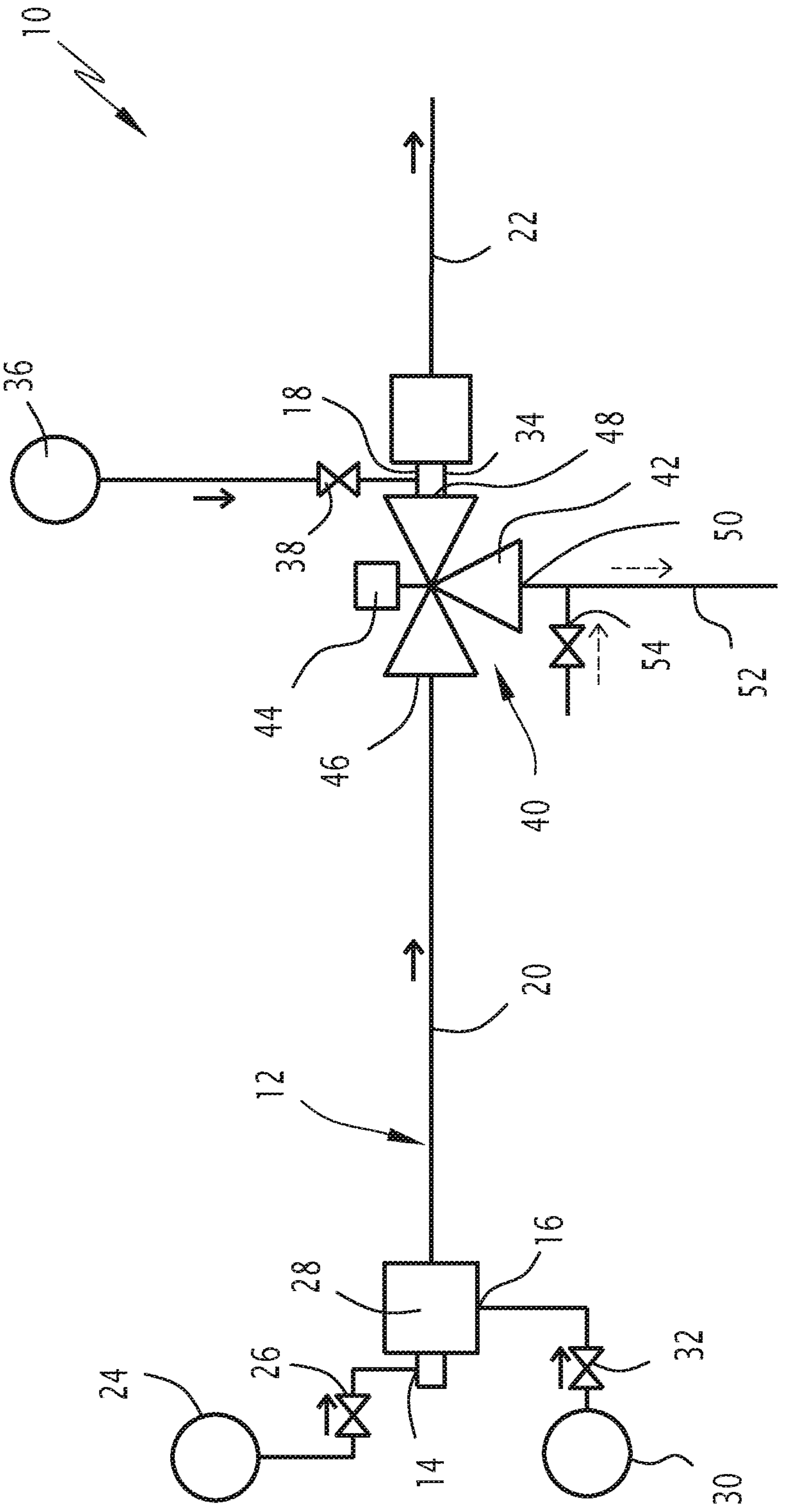
FIG. 2 is a schematic view of a second example of a mixing installation according to one embodiment of the invention.

Another example of a mixing installation 10 for forming a multi-component product according to the invention is shown in FIG. 2.

Such an installation allows to produce a mixture of products intended to be sprayed or extruded, for example a paint or a paint base, mastics, lacquers, adhesives.

The installation comprises a material flow line 12, feeding in practice an applicator or a spraying device (not shown).

The flow line 12 is provided with a first injection inlet 14 of a first material component, a second injection inlet 16 of a second material component and a third injection inlet 18 of a third material component.

The second injection inlet 16 is arranged downstream of or parallel to the first injection inlet 14, here in the example shown downstream of the first injection inlet 14.

The third injection inlet 18 is arranged downstream of the first injection inlet 14 and the second injection inlet 16.

Thus, the flow line comprises a first part 20, between the second injection inlet 16 and the third injection inlet 18, and a second part 22, downstream of the third injection inlet 18.

The first part 20 of the flow line 12 is provided for the flow of a material comprising the first material component and the second material component, without the third material component.

The second part 22 of the flow line 12 is provided for the flow of a material comprising the first material component, the second material component, and the third material component.

Each product component is a fluid material.

The first injection inlet 14 is fed by a supply 24 of the first material component.

The first material component is, for example, a base product, in this case a paint base.

The supply of the first material component to the first injection inlet 14 is, for example, controlled by a first injection valve 26.

Alternatively, the first injection inlet 14 is fed continuously without possible interruption by a valve.

The second injection inlet 16 is adapted to inject the second material component into the first material component flowing in the flow line 12 at the second injection inlet 16, for example at an injection block 28.

The second injection inlet 16 is fed by a supply 30 of the second material component.

The second material component is, for example, a catalyst or a hardener.

The supply of the second material component to the second injection inlet 16 is, for example, controlled by a second injection valve 32.

Alternatively, the second injection inlet 16 is fed continuously, without interruption by a valve.

The installation is adapted to dose the injected first material component and the injected second material component according to a desired first ratio of first material component to second material component.

The first material component and the second component material are then in contact in the first part 20 of the flow line.

In one embodiment, the flow line 12 presents a mixer, which may comprise a static mixer and/or a dynamic mixer, arranged in the first part 20 of the flow line 12.

The mixer is adapted to improve the mixing of the first material component and the second material component.

The mixing of the first material component and the second material component, referred to as first mixing, causes a reaction to start between the first material component and the second material component, in the first part 20 of the flow line 12.

The reaction comprises, for example, curing and/or drying the first mixture.

This first mixture has a first service life.

By service life is meant the length of time that this first mixture is considered usable.

The first service life depends, in particular, on the nature of the first material component and the second material component, and also, for example, on the ratio of the amount of the first material component to that of the second material component.

The first service life is, for example, less than one hour.

The third injection inlet 18 is adapted to inject the third material component into the flow line 12 at the third injection inlet 18, specifically into the first mixture.

The third injection inlet 18 is arranged in an injection block 34.

The third injection inlet 18 is fed by a supply 36 of the third material component.

The third material component is, for example, a diluent, which may comprise water or a solvent.

The supply of the third material component to the third injection inlet 18 is, for example, controlled by a third injection valve 38.

Alternatively, the third injection inlet 18 is supplied continuously, without interruption by a valve.

In the present embodiment, the installation is adapted to dose the injected third material component as a function of a desired second ratio of the amount of third material component to the amount of first and/or second material component.

Here, the third material component dilutes the first mixture in the second part 22 of the flow line 12.

In one embodiment, the flow line 12 presents a mixer, which may comprise a static and/or dynamic mixer, arranged in the second part 22 of the flow line 12.

The mixer is adapted to improve the mixing of the first mixture and the third material component.

The mixing of the first mixture and the third material component is herein referred to as the second mixture.

The addition of the third material here results in the dilution of the first mixture.

In particular, this results in a mixture with the desired viscosity, especially for optimal subsequent application of the multi-component product.

The reaction of the first mixture is then, for example, slowed down or stopped, at the time of dilution.

For example, diluting the first mixture with the third material component allows the curing of the multi-component product to be delayed before it is considered unusable.

This second mixture has a second service life.

The second service life is strictly greater than the first service life.

The second service life is, for example, greater than two hours.

The flow line 12 is provided with a purge 40.

The purge 40 is arranged upstream of the third injection inlet 18 and downstream of the first injection inlet 14 and the second injection inlet 16.

Here, the purge 40 is positioned closest to the third injection inlet 18.

In the example shown, the purge 40 is arranged upstream of the injection block 34 comprising the third injection inlet 18 and adjacent to said injection block 34.

The distance between the purge 40 and the third injection inlet 18 is less than or equal to 5 centimeters.

The purge 40 is movable between an active purge state and a passive state.

In the active state, the purge 40 is adapted to purge the part of the flow line 12 upstream of said purge 40, in other words, here substantially the first part 20 of the flow line 12.

In the passive state, the purge 40 allows material to flow through the flow line 12, in other words, from the first part 20 to the second part 22 of the flow line 12.

In the example shown, the purge 40 comprises a purge valve 42.

The purge 40 is controllable by a controller 44.

The purge valve 42 is here a three-way valve comprising an inlet 46 and two outlets 48, 50.

The inlet 46 is connected to the flow line 12 upstream of the purge 40.

A first outlet 48 is connected to the flow line 12 downstream of the purge 40.

The inlet is selectively connected to one of the two outlets.

More specifically, in the active state of the purge, the inlet is connected to the second outlet 50, and in the passive state, the inlet is connected to the first outlet 48.

The purge 40, more particularly the second outlet 50 of the purge valve 42, is, for example, connected to a purge pipe 52. Thus, the purge 40, in an active purge state, discharges the material upstream in the flow line into the purge pipe 52.

Several alternatives may allow this function to be achieved. In one embodiment, the sprayer or applicator, at the end of the second part 22, of the flow line 12 is closed, which blocks the flow of material into the second part 22 of the flow line 12, and then, during the injection of the material into the first part 20, of the flow line 12, causes the material in the first part 20 to flow toward the purge pipe 52. In one alternative, the purge valve 42 is able to open the second outlet 50 and to close the first outlet 48 when it enters the active purge state, thereby directing the flow of product injected into the first part 20 toward the purge pipe 52.

The purge pipe 52 is, for example, connected to a waste container, whereby the material discharged into the purge pipe 52 is discharged into the waste container.

Advantageously, the installation comprises, for example, a flush valve 54 arranged and able to inject flush liquid between the purge 40 and the purge pipe 52, more particularly between the second outlet 50 and the purge pipe 52.

The flush valve 54 allows flushing of the flush pipe 52.

Alternatively, the installation does not comprise a purge pipe, but comprises a waste container, with the purge 40 directly discharging material upstream in the flow line 12 into the waste container. By "directly" is meant that there is no pipe between the purge 40, more specifically the second outlet 50 of the purge valve 42, and the waste container.

The controller 44 is able to move the purge 40 between the active state and passive state.

The controller 44 is, for example, a valve intended to be moved manually by a user.

Alternatively, the controller 44 is an automatic control module.

The control module is, for example, implemented as software, or a software brick, executable by a processor.

Alternatively, the control module is realized in the form of a programmable logic component, such as an FPGA (Field Programmable Gate Array), or even in the form of a dedicated integrated circuit, such as an ASIC (Application Specific Integrated Circuit).

When the control module is implemented as one or more software programs, in other words, as a computer program, it is further able to be recorded on a computer-readable medium, not shown. The computer-readable medium is, for example, a medium capable of storing electronic instructions and of being coupled to a bus of a computer system. For example, the readable medium is an optical disk, a magneto-optical disk, a ROM memory, a RAM memory, any type of non-volatile memory (for example, EPROM, EEPROM, FLASH, NVRAM), a magnetic card or an optical card. A computer program with software instructions is then stored on the readable medium.

The purge 40 is able to selectively purge the flow line 12 upstream of the purge 40.

In particular, this allows only a part of the flow line to be purged, rather than having to purge the entire flow line, even when the reason for the purge is located in the first part of the flow line.

In the example mentioned, it is, for example, particularly advantageous to be able to purge the flow line at the purge when at least part of the first mixture in the first part has been made, by mixing the first material component and the second material component, for a period of time longer than the first service life, while the second mixture in the second part has been made for a period of time shorter than the second service life.

In a first embodiment, the first part 20 of the flow line 12 is purged by means of the purge 40 when it is necessary to purge the product present in the first part 20.

For example, if a wrong ratio of dosing between the first product and the second product has been made and injected into the flow line 12, it is possible to purge the first part 20 while retaining the mixture present in the second part 22.

In another example, during an interruption in the use of the system, it may be necessary to purge the first mixture before it begins to react in the line, while retaining the second mixture with the longer service life in the second part 22.

Thus, it is possible to purge only the first mixture in the part of the flow line upstream of the purge, which substantially corresponds to the first part.

All of the second mixture in the second part can therefore be retained in the second part 22 if there is no need to purge this mixture.

This results in a large reduction in purged material, which is wasted, and in waste to be processed. In practice, this economizes the material contained in the line between the purge 40 and the device for spraying or applying the treatment material. The rate of material thus economized represents a ratio between the volume of product contained in the second part 22 relative to the volume contained in the flow line 12. In practice, the volume contained in the second part 22 can represent ten to twenty times the volume contained in the first part 20. In this hypothesis, it is possible to achieve an economy of product on a purge of the order of 90% relative to a structure in which the product present in the second part 22 would necessarily be purged at each purging of the first part 20. In other words, such a structure would make it possible to achieve a reduction of the order of 90% of the waste produced at the time of a purge of the flow line 12.

In one alternative, it is also possible to inject a rinse product from the third material component supply 36 to perform a purge of the second part 22 without purging the first part 20. For example, the first part 20 can be cleaned with a first product, for example solvent, and the second part 22 can be cleaned with a second product, for example water, or a second solvent. This saves the use of polluting solvents.

In this alternative, the valve 42 may be configured to close the first outlet 48, thereby preventing product injected from the third material component supply 36 from flowing back into the first part 20. This further allows the first part 20 and the second part 22 to be flushed simultaneously with two different flushing products, thereby reducing the time required for flushing.

This also allows to create a second mixture in the first part 20 independently of the second part 22, for example during the rinsing of the second part 22, thereby reducing the cycle time.

Figure 3:
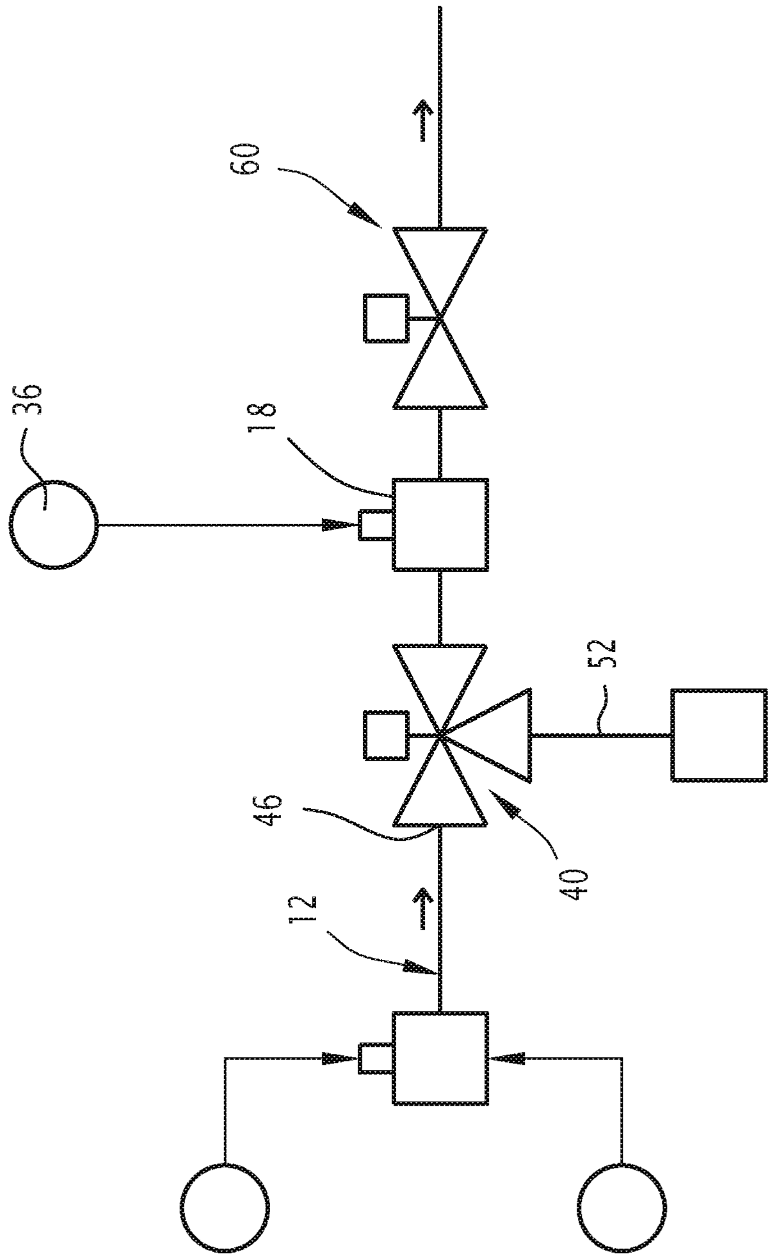
FIG. 3 is a schematic view of a third example of a mixing installation according to one embodiment of the invention.

In another alternative shown in FIG. 3, a valve 60 is located downstream of the third injection inlet 18.

The valve 42 of the purge 40 is then, for example, configured to be able to close the inlet 46 and put the first outlet 48 and the second outlet 50 in communication.

A cleaning of the purge pipe 52 from the supply of the third material component 36 can then be performed by closing the inlet 46 with the purge valve 42 and closing the valve 60, for example by injecting the third material component 36, the latter being a diluent, at the third injection inlet, for example by means of an injection valve.

Alternatively, the third injection inlet is further connected to a cleaning fluid supply, for example by means of an injection valve.

Alternatively, the flow line 12 comprises a cleaning injection inlet arranged between the purge 40 and the valve 60, the cleaning injection inlet being connected to a supply of cleaning fluid, for example by means of an injection valve.

Thus, with the inlet 46 of the valve 42 closed, the third material component or cleaning material flows from the second outlet 50, into the purge pipe 52.

It is therefore no longer necessary to provide a flush valve for cleaning the purge pipe 52. This reduces production cost and increases reliability.

Figure 4:
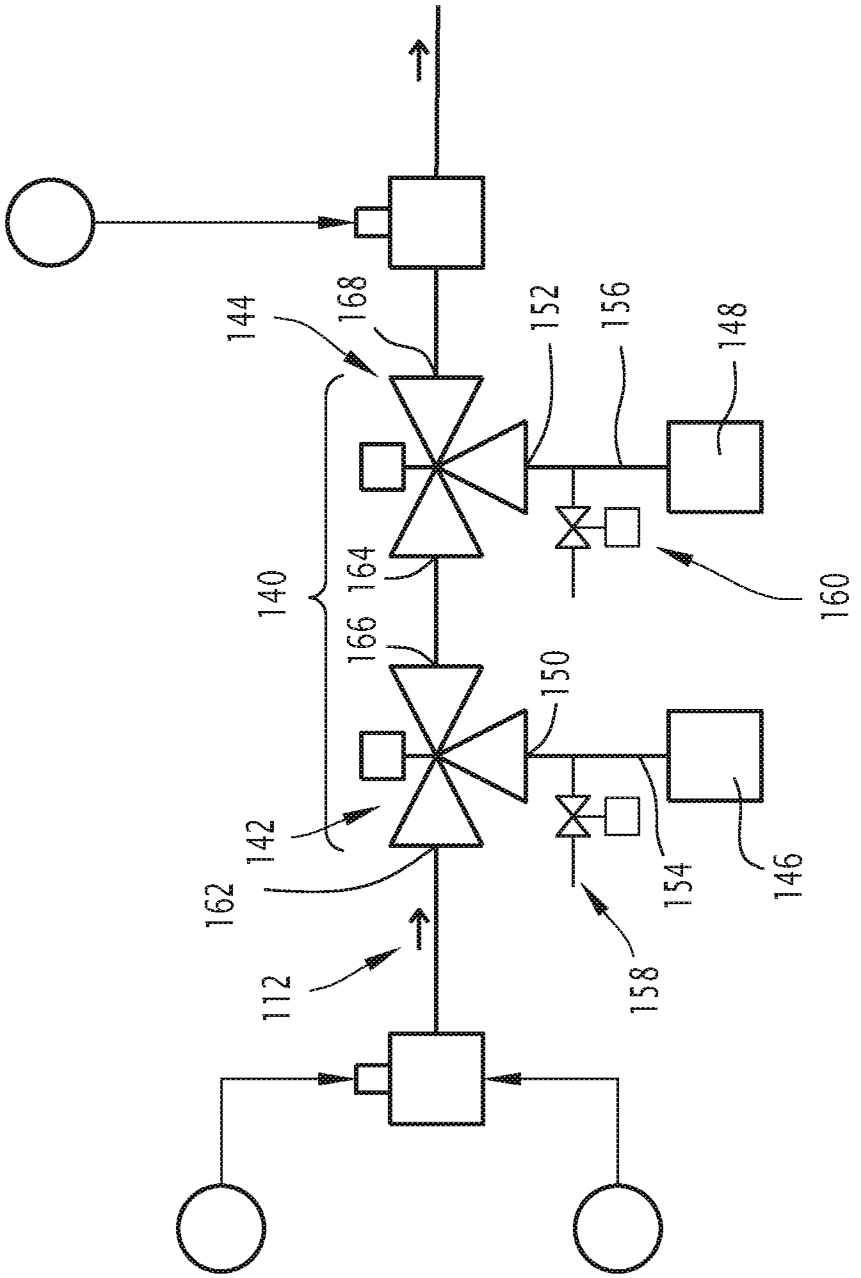
FIG. 4 is a schematic view of a fourth example of a mixing installation according to one embodiment of the invention.

In another alternative shown in FIG. 4, the purge 140 includes a plurality of valves 142, 144, each of which, for example, being intended to discharge the mixture to different waste tanks 146, 148.

More particularly, the plurality of valves 142, 144 are similar to that described above and arranged in series and in succession along the flow line 112.

Thus, the first outlet of each valve 142 other than the last is connected to the inlet of the next valve 144.

Each valve 142, 144 is, for example, connected at its respective second outlet 150, 152 to a purge pipe 154, 156 or directly to a respective waste container.

Each purge pipe 154, 156 is, for example, arranged with a waste container 146, 148 and/or a flushing system 158, 160 as described above with respect to the case where the purge comprises a valve.

Alternatively, a valve is located downstream of the purge 140 similarly to that which was previously described with respect to FIG. 3.

Each valve 142, 144 is able to be moved between a purge state and a bypass state. In the purge state, the inlet 162, 164 of the corresponding valve 142, 144 is connected to its second outlet 150, 152, while in the open state, the inlet 162, 164 of the corresponding valve 142, 144 is connected to its first outlet 166, 168.

When at least one of the valves 142, 144 is in its respective purge state, the purge 140 is in an active state.

When all of the valves 142, 144 are in their respective open state, the purge 140 is in a passive state, in other words, the material entering the purge at the inlet 162 of the first of the valves 142 flows, from valve to valve, toward the outlet 168 of the last of the valves 144.

This allows for sorting of the purged products for better product recycling.

A method for controlling a mixing installation will now be described.

A mixing installation as previously described is provided.

The purge is in the passive state.

The method comprises injecting a first material component at the first injection inlet 14, injecting a second material component at the second injection inlet 16, and injecting a third material component at the third injection inlet 18.

In one embodiment, the first material component is continuously injected into the flow line 12, 112, the second material component and the third material component each being selectively injected, more particularly so as to achieve the desired first ratio and the desired second ratio.

The injection of the second material component is, for example, performed continuously, with the volume flow of the second material component being adjusted to achieve the desired first ratio.

Alternatively, the injection of the second material component is performed sequentially, so as to achieve the desired first ratio.

Similarly, the injection of the third material component is, for example, performed continuously, with the volume flow of the third material component being adjusted to achieve the desired second ratio.

Alternatively, the injection of the third material component is performed sequentially, so that the desired second ratio is achieved.

The materials flow through the flow line.

The method comprises a step of monitoring the material in the flow line opposite the purge 40, 140 and a step of moving the purge 40, 140 into the active state based on the monitoring.

In one embodiment, the step of monitoring the material comprises a step of monitoring the length of time between injecting the second material component at the second injection inlet and its flow opposite the purge 40, 140.

If said length of time is greater than the first service life, then the purge is moved, for example automatically by the controller 44, into the active purge state to discharge the first mixture of which the time spent within the first part 20 has exceeded the first service life.

The first service life is, for example, determined in advance.

Once said first mixture of which the time spent within the first part 20 has exceeded the first service life has been discharged, the purge is then moved back into the passive state.

Additionally, or alternatively, the step of monitoring the material comprises a step of analyzing the product in the flow line 12, 112 opposite the purge 40, 140, for example by optical means.

The optical means are, for example, able to observe the material passing opposite the purge 40, 140, more particularly the inlet 46, 162 of the purge valve 42 or the first purge valve 142 of the purge 140 according to the direction of flow, to detect the state of the first mixture, in particular the level of curing of the first mixture.

Alternatively, the viscosity of the second mixture within the first part 20 is analyzed using a viscometer, or two pressure transducers located one downstream of the other at the first part 20. In this way, the viscosity of the mixture can thus be inferred from the flow data and the pressure drop in the line.

If the aspect of the analyzed first mixture is not satisfactory, then the purge is moved, for example automatically by the controller 44, into the active purge state to discharge the first mixture until the aspect is again satisfactory.

Once said first mixture with the unsatisfactory aspect is evacuated, the purge is then moved back into the passive state.

The discharged first mixture is, for example, discharged through the purge pipe 52, 154, 156.

If necessary, after the purge has moved into the passive state, the flush valve 54, 158, 160 is activated, so as to flush the purge pipe 52, 154, 156.

Alternatively, the purge pipe 52, 154, 156 is flushed by closing the valve 60 and the inlet 46, 162 of the purge valve 42 or the first purge valve 142 of the purge 140 according to the direction of flow and injecting the third material component or a cleaning fluid.

In particular, this allows to prevent curing of the first mixture in the purge pipe.

Alternatively, the discharged first mixture is, for example, discharged directly into the waste container.

Thus, the purge 40 allows, in the first place, to easily discharge the first mixture that does not meet the criteria, in particular before it has cured and is likely to require an intervention to clean the installation or even to damage the installation.

The purge 40 also allows to evacuate only the first mixture that does not meet the criteria, which then allows to achieve a satisfactory multi-component product, and thus to limit the waste on the one hand and the waste to be processed on the other.

In the embodiment shown in FIG. 4, the method further comprises a determination of the purge valve 142, 144 to be moved from its open state to its purge state to move the purge 40 to the active position.

The determination is, for example, realized as a function of the nature of the first mixture passing opposite the purge 40, in other words, to be discharged.

For example, if the first mixture is a mixture of a product A and a product B, a first valve is moved from its open state to its purge state, to purge the first mixture; whereas if the first mixture is a mixture of a product A and a product C, the product C requiring a different treatment from the product B for the treatment of the waste, then it will be a second different valve that is moved from its open state to its purge state, to purge the first mixture.

This allows for sorting of the purged products for better product recycling.

In a particular embodiment, the multi-component product is composed of strictly more than three material components.

The mixing installation comprises strictly more than three material component injection inlets, as described above, placed successively along the flow line.

The mixing installation then comprises, for example, upstream of each injection inlet from the third injection inlet, a respective purge as described above. Alternatively, or additionally, the mixing installation then comprises, for example, downstream of each injection inlet from the third injection inlet and arranged directly at the outlet of said injection inlet, a respective purge such as described above.

Each purge is able to be controlled independently, so as to discharge the material at said purge.

The control method is then adapted accordingly by monitoring the material in the flow line opposite each purge and possibly moving the corresponding purge into the active state as a function of the monitoring.

Similarly, this installation also makes it possible to purge the flow line in sections and thus limit the amount of product discharged.

The invention also relates to a mixing installation 10 for forming a multi-component product, the mixing installation 10 comprising a flow line 12; 112 of material, the flow line 12; 112 being provided with a first injection inlet 14 of a first material component, a second injection inlet 16 of a second material component and a third injection inlet 18 of a third material component, the second injection inlet 16 being arranged downstream of or parallel to the first injection inlet 14, the third injection inlet 18 being arranged downstream of the first injection inlet 14 and the second injection inlet 16, characterized in that the flow line 12; 112 is provided with a purge 40; 140 arranged downstream of the third injection inlet 18 and directly at the outlet of the third injection inlet 18 or arranged upstream of the third injection inlet 18 and downstream of the first injection inlet 14 and the second injection inlet 16, the purge 40; 140 being movable between an active state of purging an upstream part of the flow line and a passive state in which the purge 40; 140 allows material to flow in the flow line 12; 112.

The invention claimed is:

1. A mixing installation for forming a multi-component product, the mixing installation comprising a flow line of material, comprising:

a first injection inlet of a first material component;

a second injection inlet of a second material component, the second injection inlet being arranged downstream of or parallel to said first injection inlet;

a third injection inlet of a third material component, the third injection inlet being arranged in an injection block downstream of said first injection inlet and said second injection inlet; and a purge arranged (i) adjacent to and downstream of the injection block and directly at the outlet of said third injection inlet, or arranged (ii) adjacent to and upstream of the injection block, or arranged (iii) in the injection block downstream of said third injection inlet, the purge being movable between an active state of purging an upstream part of the flow line and a passive state wherein the purge allows material to flow in the flow line.

2. The mixing installation according to claim 1, wherein said purge comprises at least one purge valve.

3. The mixing installation according to claim 2, comprising at least one waste container, each purge valve directly discharging the material upstream in said flow line into said at least one waste container.

4. The mixing installation according to claim 1, wherein said purge comprises a plurality of purge valves, each purge valve being movable between a purge state, in which said purge valve purges the material passing through said purge valve, and an open state, in which said purge valve allows material to flow in said flow line opposite said purge valve.

5. The mixing installation according to claim 1, comprising at least one purge pipe, each purge pipe being connected to said purge, said purge discharging the material upstream in said flow line into said at least one purge pipe.

6. The mixing installation according to claim 5, comprising a flush valve arranged and able to inject flush liquid between said purge and said at least one purge pipe.

7. A control method for controlling a mixing installation, comprising:

providing a mixing installation according to claim 1, the purge of the flow line of the mixing station being in the passive state;

injecting a first material component at the first injection inlet of the flow line of the mixing station;

injecting a second material component at the second injection inlet of the flow line;

injecting a third material component at the third injection inlet of the flow line;

monitoring the material in the flow line opposite the purge; and moving the purge into the active state as a function of the monitoring.

8. The control method according to claim 7, wherein said monitoring comprises analyzing the product in the flow line opposite the purge, and/or monitoring the length of time between injecting the second material component and its flow opposite the purge.

9. The control method according to claim 7, wherein the first material component is continuously injected into the flow line, and the second material component and the third material component are each selectively injected.

10. The mixing installation according to claim 1, wherein said purge is arranged downstream of said third injection inlet, and there is no pipe between said purge and the outlet of said third injection inlet.

11. The mixing installation according to claim 1, wherein the distance between said purge and said third injection inlet is less than or equal to 5 centimeters.

12. The mixing installation according to claim 1, wherein said purge is arranged in the injection block downstream of said third injection inlet.

13. The mixing installation according to claim 1, wherein said purge is arranged upstream or downstream of the injection block and juxtaposed to the injection block.

14. The mixing installation according to claim 4, wherein said plurality of purge valves are arranged in series and in succession along the flow line.

* * * * *